Figure 1:
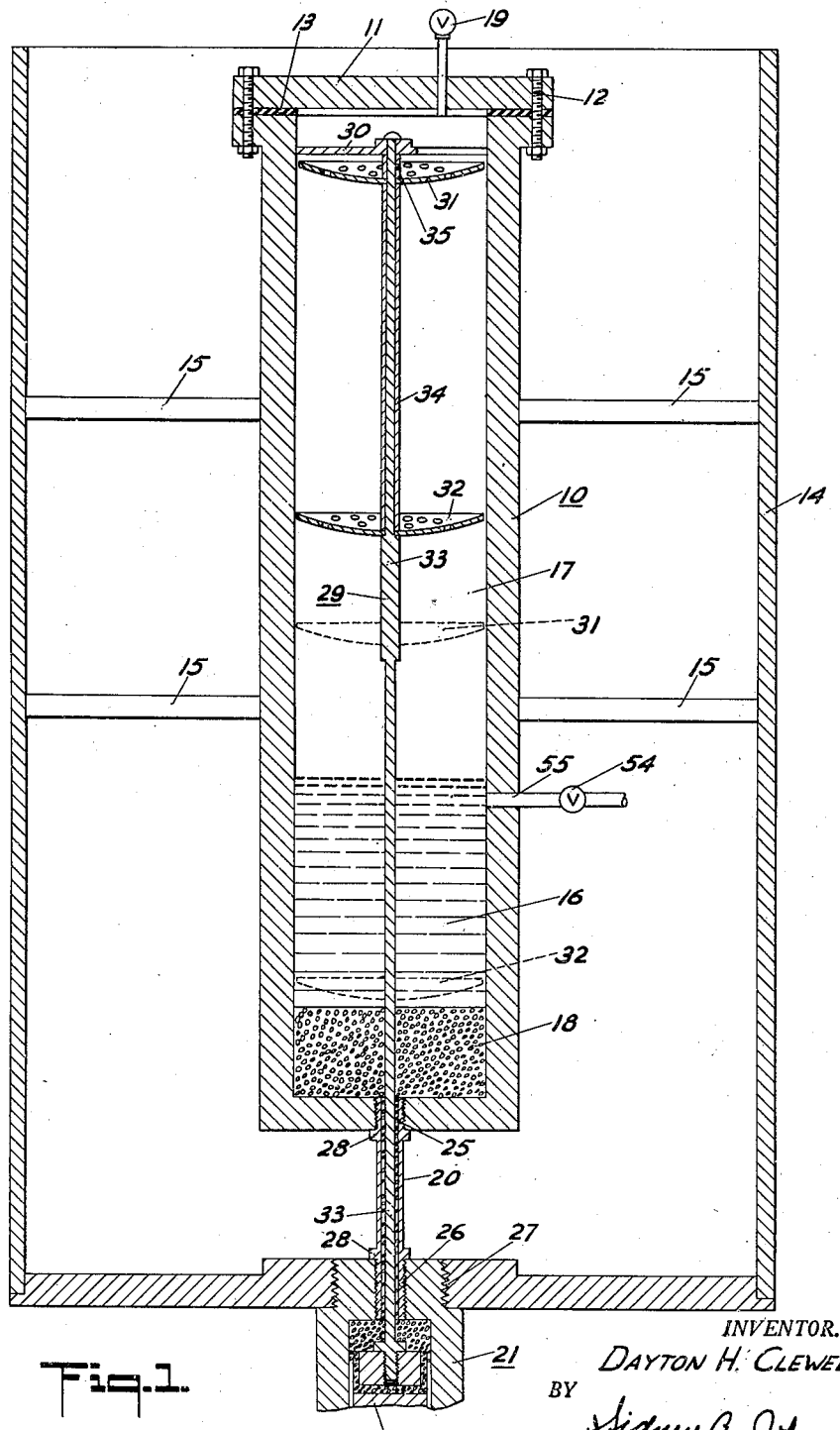

Feb. 21, 1950 D. H. CLEWELL 2,498,393
AGITATING DEVICE

Filed Nov. 13, 1946 2 Sheets-Sheet 1

INVENTOR.
DAYTON H. CLEWELL
BY
Sidney A. Johnson
ATTORNEY

Feb. 21, 1950     D. H. CLEWELL     2,498,393
AGITATING DEVICE
Filed Nov. 13, 1946     2 Sheets-Sheet 2
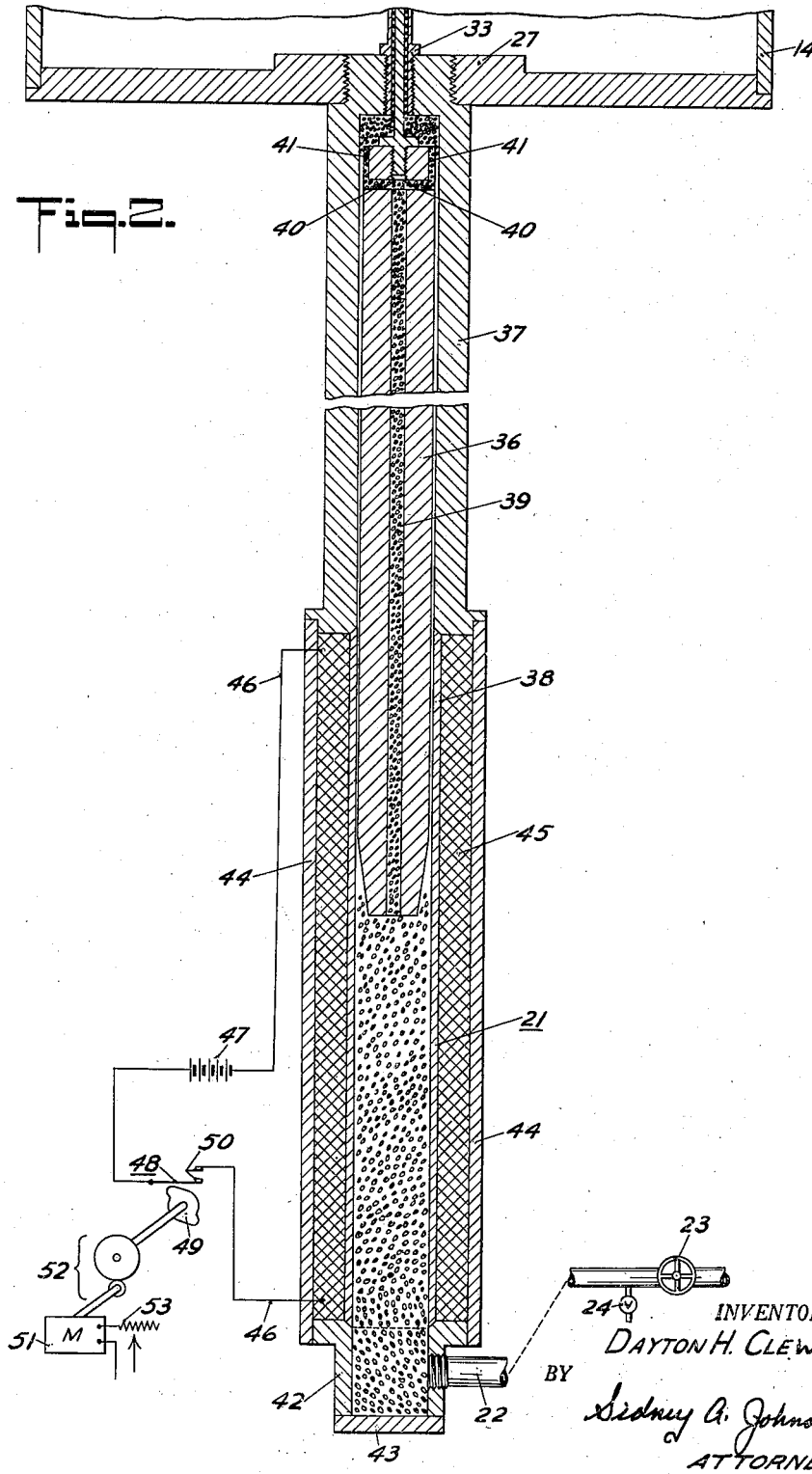
INVENTOR.
DAYTON H. CLEWELL
BY
Sidney A. Johnson
ATTORNEY Patented Feb. 21, 1950

2,498,393

UNITED STATES PATENT OFFICE 2,498,393

AGITATING DEVICE

Dayton H. Clewell, Dallas, Tex., assignor, by mesne assignments, to Socony-Vacuum Oil Company, Incorporated, New York, N. Y., a corporation of New York Application November 13, 1946, Serial No. 709,447

13 Claims. (Cl. 259—113)

This invention relates to stirring or agitating devices and is particularly suited for use in apparatus utilized in determination of liquid-vapor equilibria of organic liquids, such as crude oils, at high pressures and temperatures.

In accordance with the invention, the liquid being tested or processed is disposed in a closed container structure in which an agitator unit including a magnetic plunger is reciprocated under the control of an external solenoid or equivalent without need for transmission of motion through stuffing boxes or other liquid-sealing devices.

Further in accordance with the invention and more specifically, the actuating plunger is disposed in a sealed cylinder or chamber containing a second liquid provided for transmission of pressure to the liquid under test. The solenoid encircles the second chamber in inductive relation to the plunger whose motion in response to intermittent energization of the solenoid is transmitted to agitator plates in the test chamber by a rod, or equivalent connection, which extends through a passage or pipe provided for flow of the pressurizing liquid between the chambers.

Preferably and further in accordance with the invention, the pressurizing liquid floats the agitator unit and so effects its return movements in the intervals between successive energizations of the solenoid.

The invention further resides in features of construction, combination and arrangement herein disclosed and claimed.

For more detailed understanding of the invention reference is made to the accompanying drawings, in which:

Fig. 1 is an elevational view, in cross section, of the upper portion of a stirring device and associated container structure; and Fig. 2 is a continuation of and overlaps Fig. 1.

The container 10 is provided with a removable cap or cover 11 firmly clamped against the upper open end of the container to seal it against the atmosphere. Preferably there is provided a gasket 13 of neoprene or equivalent material resistant to the liquid and vapors within the container 10 at the temperatures and pressures involved in their test or treatment. The material and strength of the container and cap should also be selected to withstand the pressures and temperatures involved which may in tests of crude oils be of the order of 10,000 pounds per square inch and 400 degrees F.

To attain the required temperature of its contents, the container 10 is disposed within an outer container 14 provided with spiders 15 to position the container 10 and filled with a liquid bath maintained at the desired temperature by any suitable means, not shown. The liquid 16 to be tested or processed is disposed within the cylinder 10 with its level suitably below the top of the cylinder to provide a confined space 17 in which the vapors of the liquid, which may be a single liquid or a mixture of liquids may collect. During the testing or processing of the liquid 16, it is subjected to pressure applied to a second non-miscible liquid 18, for example mercury, selected in dependence upon the nature of the particular liquid 16 and tests conducted. Preferably and for reasons which hereinafter appear, it is of high density and, when not unsuited, a metal having a relatively low melting point, such as mercury or lead. The pressure within the space 17 may be read from a gauge 19 and samples of the vapor may be withdrawn for analysis from time to time under different conditions of pressure and temperature by a valve which may be in the gauge line. For analysis of the composition of the liquid 16 during the test or run, samples may be withdrawn by opening valve 54 in the sampling line 55 which enters the cylinder 10 below the level of the liquid 16.

For admission or withdrawal of the liquid 18 to vary the pressure during a test or run, the bottom of the cylinder 10 is connected by pipe 20 to a lower container 21 in turn connected by pipe 22, Fig. 2, to a high-pressure pump or storage tank. By manipulation of valve 23 in the supply line or bleeder valve 24, pressurizing liquid 18 may be added to or withdrawn from the cylinder 10 so to attain the desired pressure at the interface of the liquid 16 and its vapors.

In the particular construction shown, the pipe 20 which provides for flow of the pressurizing liquid 18 between the containers or chambers 10 and 21, is in vertical alignment with the axes of the two chambers, its upper end being threadably received by the opening 25 in the bottom of the chamber 10 and its lower end being threadably received by the opening 26 in the upper end of the closed container 21. By this arrangement and construction, the passage 20 serves not only to pass the pressurizing liquid but also the motion-transmitting element of an agitator later herein described.

The flanges or shoulders 28 of pipe 20 are provided for sealing purposes and may compress gasket or sealing material to prevent escape of liquid at the pressures involved. The upper end of the lower container 21 is threadably received by opening 27 in the bottom of the upper outer container 14.

To insure that the vapors in space 17 are of the same composition throughout and to insure uniformity of composition and temperature of the liquid 16, there is provided a stirrer or agitator assembly 29. At its upper end, Fig. 1, the assembly 29 is provided with a guide member 30 which slidably engages the inner wall of the cylinder 10 and may be in the form of a webbed disc or plate to permit free passage therethrough of the vapors in the space 17. The guiding member 30 and two agitator cups or plates 31 and 32 are mounted upon a rod 33 with desired separations procured by the spacer sleeves 34 and 35. As shown, each of the plates 31 and 32, approximately of the same diameter as cylinder 10, is provided with a plurality of openings which during reciprocation of the rod 33 respectively effect turbulence of the vapors in space 17 and of the liquid 16.

The magnetic plunger or core 36 of soft steel, iron, or other suitable magnetic material attached to the lower end of rod 33 is slidably received by the member 37 which forms the upper end of the lower container 21. The sleeve 38 of non-magnetic material, preferably stainless steel, is suitably secured as by welding to member 37 with its bore aligned with and forming a continuation of the bore of member 37.

To permit free flow of the pressurizing liquid 18, the plunger 36 is provided with at least one longitudinally extending passage 39 which near the top of the plunger connects with radial passages 40, in turn communicating with the peripheral grooves 41 extending to the upper face of the plunger. This construction is preferred over one in which the liquid, or at least the major part of it, flows on the outside of the plunger because it reduces the air gap and so provides for greater magnetic pull for a given input to the actuating solenoid later described. However, the plunger 36 is slightly smaller in diameter than the bore of members 37 and 38 so that there is always a thin layer or sheet, of for example 0.005 inch thickness, of liquid interposed between the plunger and cylinder wall to minimize wear. The lower end of plunger 36 is preferably tapered to obtain uniform magnetic attraction throughout the length of the stroke.

The lower end of the sleeve 38 is suitably attached as by welding to the cup member 42, of iron or other magnetic material, in turn similarly attached to the end cover 43, of stainless steel or other non-magnetic material, and with it forming the bottom end of the lower chamber 21. The member 42 receives the pipe 22 for addition or withdrawal of the pressurizing liquid 18 as above described.

The outer sleeve 44, also of iron or other metal having high magnetic permeability, is connected at its upper end to the pole member 37 and at its lower member to the other pole member 42, and forms a housing for the solenoid winding 45 which surrounds or encircles the sleeve 38. The plunger or core 36 is of such length that when in its uppermost position, Fig. 2, it extends partly into the solenoid.

Preferably, the pressurizing liquid is mercury or other metal having a low melting point so that the agitator assembly is held by the buoyant force of the liquid 18 in the upper full-line position shown in the drawings. When the solenoid 45 is energized, the core member 36 is pulled downwardly to effect downward movement of the agitator plates 31 and 32 in the upper cylinder 10 to the position shown in dotted lines, Fig. 1. Upon de-energization of the solenoid the weight of the agitator unit is overcome by the buoyancy of the unit which thereupon returns the core and agitator plates to their upper, full-line position. During this reciprocation of the unit the liquid 18 flows to and fro through the passages 39, 40 and 41 in the plunger, but remains substantially at rest so far as its mass as a whole is concerned and with respect to the container structures 10 and 21.

When it is not feasible to use as pressurizing liquid 18 a liquid which is dense enough to overcome the weight of the agitator unit, its upward or return movements may be effected by a spring interposed between the bottom of the plunger 36 and the inner face of the end cap 43.

In the particular arrangement shown, the intermittent energization of the solenoid 45 is effected by connecting its leads 46 in circuit with a battery 47 or other source of current in series with an interrupter 48 comprising, for example, a cam 49 and contacts 50 controlled thereby. The cam 49 may be driven from any suitable source of power 51, for example an electric motor, through a speed-changing device 52. The interruption rate of switch 50 may be varied by selection or adjustment of the speed-changing device 52 or, when motor 51 is an electric motor, by change in the setting of the rheostat 53 or equivalent. To attain full stroke of the agitator, which is about eight inches in the device specifically illustrated in the drawings, the interruption rate should be so correlated to the buoyancy of the liquid 18 that the solenoid is not re-energized before the agitator completes its up-stroke but shortly thereafter if maximum full-strokes per unit time is desired.

Though a preferred form thereof has been illustrated and described, it shall be understood the invention is not limited thereto but that changes and modifications may be made all, however, within the scope of the appended claims.

What is claimed is:

1. Apparatus comprising a liquid-container structure, a buoyant agitator unit within said container structure and comprising a stirrer and a magnetic core continuously immersed in liquid in said container structure, and solenoid means in inductive relation to said core and intermittently energized repeatedly to effect downward movement of said unit, the buoyancy of said unit effecting its upward movements.

2. Apparatus comprising two vertically aligned liquid-containers having a passage connecting the bottom and top respectively of the upper and lower containers for transmission of pressure by liquid in said passage, a buoyant agitator unit comprising a stirrer in one of said containers, a magnetic core in the other of said containers and a rod extending through said passage to connect said stirrer and said core, and means for effecting reciprocation of said unit comprising solenoid means in inductive relation to said core.

3. Apparatus comprising two vertically aligned containers having a passage connecting the bottom and top respectively of the upper and lower containers for transmission of pressure by liquid in said passage, a buoyant agitator unit comprising stirrer structure in the upper container, a magnetizable core in the lower container and rod structure extending through said passage, and solenoid means in inductive relation to said core and intermittently energized repeatedly to effect downward movement of said unit.

4. Apparatus comprising an upper liquid-container, a lower liquid-container, structure providing a vertical passage connecting the bottom and top respectively of said upper and lower containers for transmission of pressure by liquid in said passage, a buoyant reciprocable agitator unit comprising a stirrer and a magnetic core disposed respectively in the upper and lower containers and a connecting rod therefore extending through said passage, and a solenoid encircling the lower container in inductive relation to said core.

5. Apparatus comprising an upper liquid-container, a lower liquid container, structure providing a vertical liquid-flow passage connecting the bottom and top respectively of said upper and lower containers, a buoyant reciprocable agitator unit comprising a stirrer in the upper container, a rod extending therefrom through said passage and an elongated core connected to said rod within the lower container, slidably engaging the lower container and having a longitudinal passage for flow of liquid therethrough, and means for effecting reciprocation of said unit comprising a solenoid encircling the lower container in inductive relation to said core.

6. Apparatus comprising a closed upper chamber for containing a liquid and vapors thereof, a lower chamber connected to the upper chamber by a passage for containing a second liquid non-miscible with the first-named liquid and for transmission of pressure thereto, stirrer structure in the upper chamber for agitating said liquid and vapors therein, a movable armature structure in the lower chamber, means mechanically connecting said stirrer and armature structures through said passage, and electromagnetic means for effecting movement of said armature structure.

7. Apparatus comprising a closed upper chamber containing a liquid and vapors thereof, a lower chamber connected to the upper chamber by a passage for transmission to said vapors through said liquid of pressure applied thereto by a second non-miscible liquid in the lower chamber, a buoyant agitator unit comprising a stirrer structure within said upper chamber, a rod extending therefrom through said passage and a magnetic plunger within said lower chamber and connected to the lower end of said rod, and a solenoid encircling said lower chamber in inductive relation to said plunger and intermittently energized to effect downward movements of said unit whose buoyancy effects its return upward movements.

8. Apparatus comprising upper and lower chambers connected by a passage and containing non-miscible liquids having different specific gravities, an agitator unit comprising stirrer structure within said upper chamber, an armature within said lower chamber and a connecting member extending through said passage, and electromagnetic means for effecting movement of said armature.

9. Apparatus comprising liquid-containing chambers connected by a liquid flow passage, stirrer structure in one of said chambers, movable armature structure in the other of said chambers, means mechanically connecting said structures including a member extending through said flow passage, and electromagnetic means for effecting movement of said armature.

10. Apparatus comprising chambers connected by a flow passage, movable stirrer structure in one of said chambers, movable core structure in the other of said chambers, a member extending through said passage for interconnecting said stirrer and armature structures, a solenoid coaxial with said movable core structure, and means for effecting energization of said solenoid to cause reciprocation of said core and stirrer structures in their said respective chambers.

11. A solenoid motor comprising a cylinder for containing liquid, a buoyant magnetic core member continuously immersed in said liquid, reciprocable in said cylinder and having flow passages for said liquid, a motion transmitting element attached to said core, and a solenoid surrounding said cylinder intermittently energizable to move said core member and element in one direction, said liquid effecting movement of said core and element in the reverse direction.

12. A solenoid motor comprising a cylinder of non-magnetic metal for containing liquid, a buoyant magnetic core member guided by and slidably movable in said cylinder, said core member being immersed in said liquid and having at least one passage for flow of liquid displaced by movement of the core and of diameter slightly less than said cylinder to insure a film of said liquid is interposed therebetween during movement of the core, and a solenoid surrounding said cylinder intermittently energizable to move said core member in one direction, said liquid effecting movement of said core in the reverse direction.

13. A solenoid motor comprising a cylinder of non-magnetic metal, a sleeve of magnetic material disposed about and concentrically spaced from the lower portion of said cylinder, a cup member of magnetic material attached to the lower ends of said cylinder and sleeve, a non-magnetic cover for said cup member cooperating therewith and said cylinder to provide a container for liquid, a buoyant magnetic core member slidable in said cylinder and biased by said liquid to position in the upper portion of said cylinder, and a solenoid disposed between said cylinder and sleeve and intermittently energizable to pull said core member toward said cup member, the buoyant force of the liquid effecting return movements of the core.

DAYTON H. CLEWELL.

REFERENCES CITED

The following references are of record in the file of this patent:

UNITED STATES PATENTS

| Number | Name | Date |
|---|---|---|
| 1,776,405 | Wilsey | Sept. 23, 1930 |
| 1,884,893 | Sharp | Oct. 25, 1932 |
| 1,897,132 | Leins | Feb. 14, 1933 |
| 2,202,860 | McPhee et al. | June 4, 1940 |

FOREIGN PATENTS

| Number | Country | Date |
|---|---|---|
| 302,387 | Great Britain | Dec. 17, 1928 |